United States Patent

Strohl

Patent Number: 6,122,355
Date of Patent: Sep. 19, 2000

[54] METHOD AND APPARATUS FOR PORTABLE PAY PHONE

[75] Inventor: Glenn E. Strohl, Edenton, N.C.

[73] Assignee: AT&T Corp., New York, N.Y.

[21] Appl. No.: 09/209,545

[22] Filed: Dec. 11, 1998

[51] Int. Cl.$^7$ ............................................. H04M 17/00
[52] U.S. Cl. ......................... 379/144; 379/357; 455/558; 455/406
[58] Field of Search ................................... 455/405, 406, 455/407, 455, 558; 379/114, 144, 355, 356, 115, 357, 112

[56] References Cited

U.S. PATENT DOCUMENTS

| | | | |
|---|---|---|---|
| 4,706,275 | 11/1987 | Kamil | 379/144 |
| 5,027,387 | 6/1991 | Moll | 379/115 |
| 5,301,234 | 4/1994 | Mazziotto et al. | 455/405 |
| 5,359,182 | 10/1994 | Schilling | 379/144 |
| 5,408,513 | 4/1995 | Busch, Jr. et al. | 379/144 |
| 5,408,526 | 4/1995 | McFarland | 379/114 |
| 5,550,897 | 8/1996 | Seiderman | 379/144 |
| 5,621,787 | 4/1997 | McKoy et al. | 379/144 |
| 5,684,866 | 11/1997 | Florindi et al. | 379/115 |
| 5,748,720 | 5/1998 | Loder | 379/144 |
| 5,764,742 | 6/1998 | Howard et al. | 379/144 |
| 5,799,067 | 8/1998 | Kikinis et al. | 379/93.06 |
| 5,907,800 | 6/1999 | Johnson et al. | 379/114 |
| 5,915,226 | 6/1999 | Martineau | 379/144 |
| 5,946,614 | 8/1999 | Robbins et al. | 379/144 |

Primary Examiner—Huyen Le
Assistant Examiner—Rexford Barnie

[57] ABSTRACT

A portable pay phone system provides a portable pay phone service that deducts payment for a call from a smart card. The cost for the requested call is determined based on the locations of the portable pay phone and a destination device (called party) and whether the smart card contains enough funds to pay for the call. The portable pay phone system maintains multiple currencies so that any currency contained in the smart card may be used to pay for the call. After the call is connected, the portable pay phone system monitors the call. If the call is completed before the purchased time is expired, any funds that were not expended are redeposited into the smart card. If the purchase time has expired before the call is completed, either the call is terminated or additional funds is debited from the smart card to continue the call. This process continues until either all the funds of the smart card is exhausted or the call is completed.

20 Claims, 4 Drawing Sheets

METHOD AND APPARATUS FOR PORTABLE PAY PHONE

BACKGROUND OF THE INVENTION

1. Field of Invention

This invention relates to a method and apparatus for portable pay phones.

2. Description of Related Art

As is well known, pay phones are devices that are placed at convenient locations and anyone can make a fixed duration phone call. Such pay phones require depositing currency (usually coins) for completion of the call. This requirement is sometimes inconvenient and thus new technology is needed to provide greater convenience for pay phones users.

SUMMARY OF THE INVENTION

A portable pay phone system provides a portable pay phone service that immediately deducts payment for a call from a smart card without pre-established service agreement with a service provider. When a request for a call from a portable pay phone is received requesting a fixed time period call, the portable pay phone system determines the cost for the requested call based on the locations of the portable pay phone and a destination device (called party) and whether the smart card contains enough funds to pay for the call. If the smart card contains sufficient funds, the portable pay phone system debits the cost for the call and connects the call.

The portable pay phone system is able to receive payment for the call in currencies of different countries. In this way, the portable pay phone system may accept payment in any currency that the smart card may have. Thus, portable pay phone users may travel abroad to any country and still be able to pay for telephone calls using their smart cards.

After the call is connected via any kind of network including telephone networks or data networks via telephony, for example, the portable pay phone system monitors the call to determine whether the call is completed before the purchased amount of time for the call has expired. If the call is completed before the time has expired, the portable pay phone system redeposits into the smart card any funds that were not expended by the call. If the purchased time has expired before the call is completed, the portable pay phone system sends a message to the portable pay phone to determine whether the call should be terminated or additional funds should be debited from the smart card to continue the call. This process continues until either all the funds of the smart card are exhausted or the call is completed.

BRIEF DESCRIPTION OF THE DRAWINGS

The invention is described in connection with the following figures wherein like numerals represent like elements, and wherein.

DETAILED DESCRIPTION OF PREFERRED EMBODIMENTS

Figure 1:
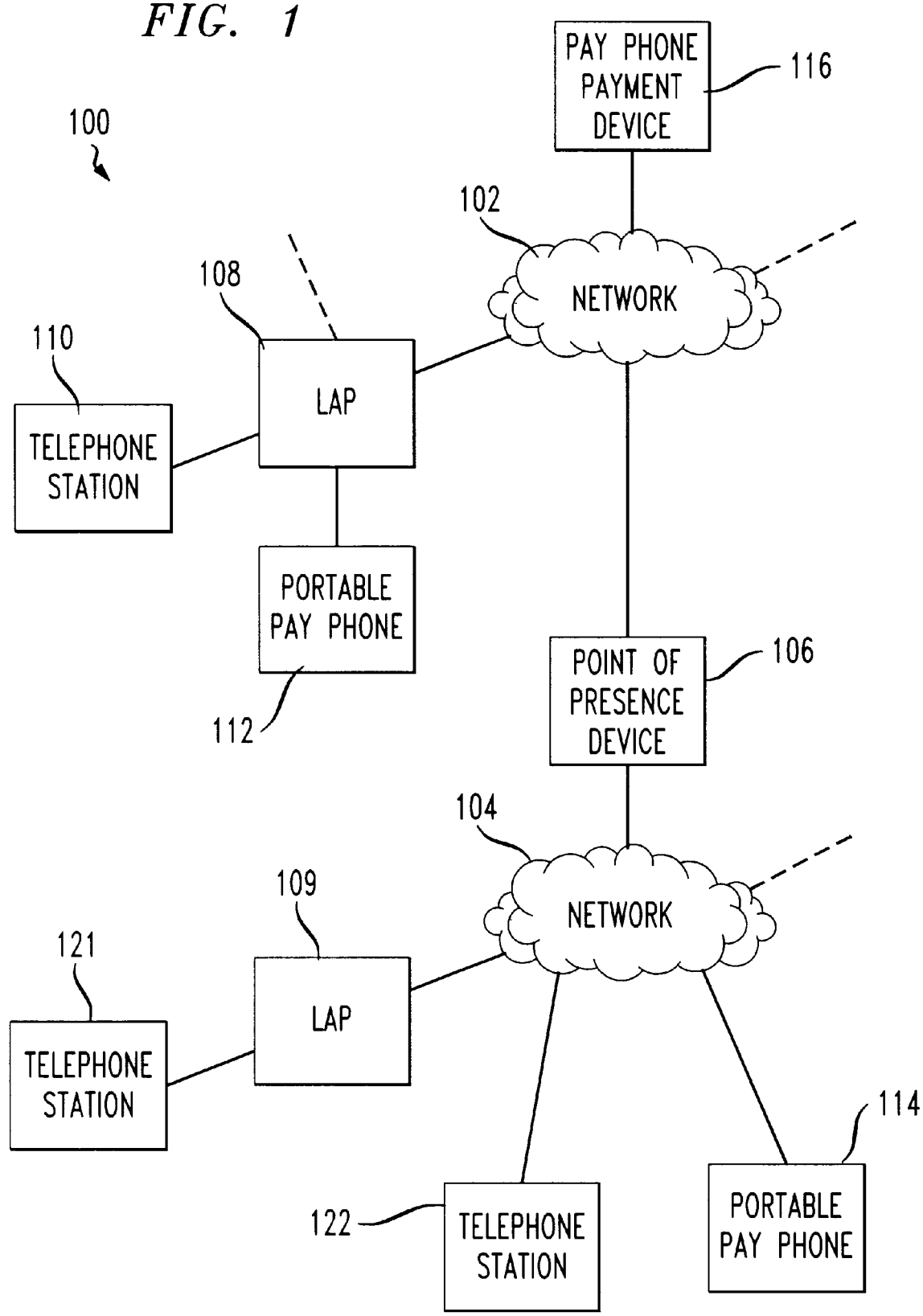
FIG. 1 is an exemplary diagram of a portable pay phone system.

FIG. 1 shows a diagram of a portable pay phone system 100. The portable pay phone system 100 includes networks 102 and 104, a pay phone payment device 116, telephone stations such as telephone stations 110, 121 and 122, and portable pay phones 112 and 114 coupled to the networks 102 and 104 via local access providers (LAPs) 108 and 109, for example. The LAPs 108 and 109 may be local exchange carriers, for example. Some telephone stations, such as telephone station 122, may interface directly to the network 104 via integrated services digital network (ISDN) lines, for example. Also, the networks 102 and 104 may be telephone networks or data networks via telephony. For ease of discussion, the networks 102 and 104 are referred to as telephone networks.

The portable pay phone system 100 may also include a point of presence device 106 that couples the telephone network 102 with the telephone network 104, for example. The telephone networks 102 and 104 may be part of telephone systems of different countries such as the United States (U.S.) and Germany, for example. Thus, if the point of presence device 106 is part of the U.S. telephone system that includes the telephone network 102, for example, then portable pay phone users may gain access to the pay phone payment device 116 through the point of presence device 106 using a local access number of the telephone network 104 which is part of the German telephone system.

For example, if the telephone network 102 is an AT&T telephone network and the point of presence device 106 is an AT&T device in Germany that links the AT&T telephone network 102 with the telephone network 104, portable pay phone users in Germany may gain access to the pay phone payment device 116 via the AT&T telephone network by calling the point of presence device 106 using a local access number (e.g., the local German telephone number of the point of presence device 106).

When a call is made via the portable pay phone 114, for example, the caller accesses the pay phone payment device 116 through the point of presence device 106 by simply dialing a local number of the telephone network 104. If the caller can gain access to the telephone network 102 directly (e.g., portable pay phone 112), then the caller merely dials the pay phone payment device access number which may be an 800 number, for example. The caller requests a call for a fixed amount of time, such as ten minutes, by using a keypad of a telephone station that is accessible to the caller and coupled to the portable pay phone device 114. The caller inserts a smart card into the portable pay phone device 114 so that the pay phone payment device 116 may access the smart card to collect payment for the desired call.

The pay phone payment device 116 may accept payment in any currency. Thus, if the smart card contains only funds in a particular currency, the pay phone payment device 116 may accept payment in that currency. If the smart card contains multiple currencies, the pay phone payment device 116 may collect the payment from a lowest cost currency based on official exchange rates, for example.

When the pay phone payment device 116 has deducted the payment from the smart card in the proper currency, the portable pay phone 114 is connected with the destination device in the desired telephone call for the fixed amount of time that has been purchased. For example, the caller may request a ten minute call for fifty cents. If the caller completes the call before the purchased amount of time has expired, the pay phone payment device 116 may redeposit into the smart card the amount of payment that was deducted in excess of the amount required to pay for the call so that the caller only pays for the actual time of the call. On the other hand, if the amount of time purchased by the caller has expired before the call is completed, the pay phone payment device 116 may output a message to the portable pay phone 114 to query whether the caller would like to continue the call or to end the call. If the caller chooses to continue the call, the pay phone payment device 116 again accesses the smart card for the additional payments. This process continues until either the caller completes the call or funds in the smart card are exhausted.

As described above, any caller may make a call using a smart card without having established a prior relationship with the portable pay phone system 100. In addition, no billing action other than deducting the amount for the call from the smart card is performed. Thus, the portable pay phone system 100 offers great convenience and efficiency.

Figure 2:
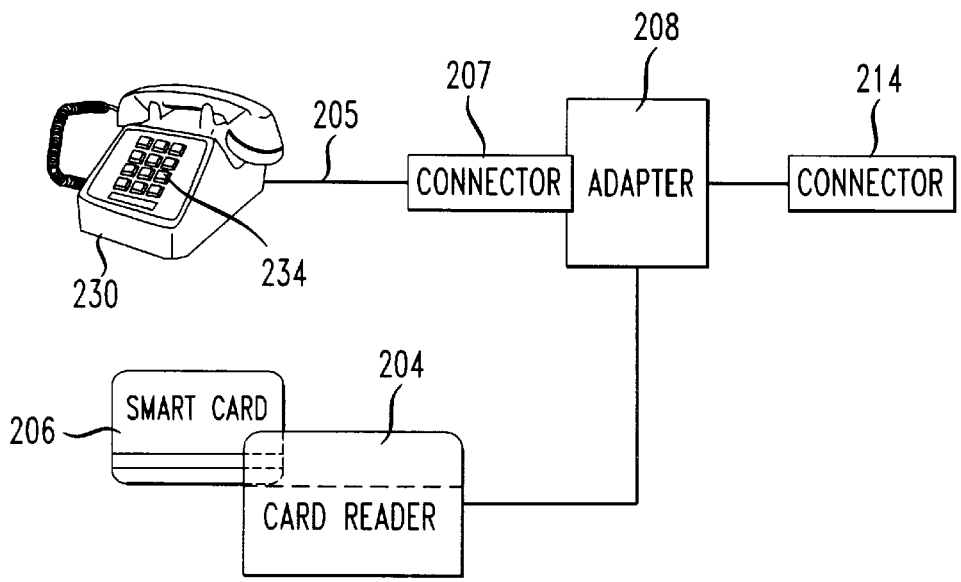
FIG. 2 is a first example of a portable pay phone.

FIG. 2 shows an exemplary diagram of a portable pay phone such as the portable pay phones 112 and 114. The portable pay phone 112, 114 may include a card reader 204, an adapter 208 that provides for a connector 207 for a telephone station 230 and a connector 214 for connection to a local telephone network such as the telephone networks 102 and 104, for example.

When the portable pay phone 112, 114, as shown in FIG. 2, is used to make a call, the caller inserts the telephone station line 205 into the connector 207 and connects the connector 214 to the telephone networks 102, 104 via a wall phone jack, for example. The caller dials the local access number of the point of presence device 106 or the pay phone payment device 116 using a telephone station keypad 234, for example. The caller may also dial the destination number so that the pay phone payment device 116 may receive a call request that includes all the necessary information related to the call. When the call request is received, the pay phone payment device 116 may send a message to the portable pay phone 112, 114 such as voice message and/or a text message to be displayed on a display of the telephone station 230, if one is provided, to request the caller to insert a smart card 206 into the card reader 204. The message may not be necessary if the smart card 206 is already inserted. When the smart card 206 is inserted into the card reader 204, the pay phone payment device 116 may access the information contained in the smart card 206 to debit payment for the call, or redeposit refunds, for example.

Figure 3:
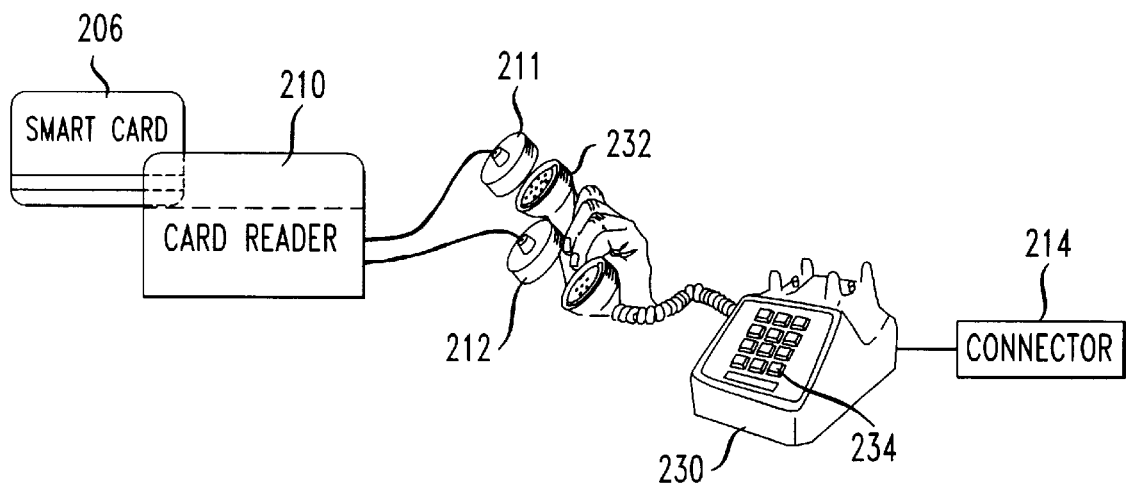
FIG. 3 is a second example of the portable pay phone.

FIG. 3 shows another embodiment of the portable pay phone device 112, 114 that includes acoustic interfaces 211 and 212 which are cupped over the speaker and microphone portions, respectively, of a handset 232 of the telephone station 230, for example. While the FIG. 3 shows the acoustic interfaces 211 and 212 as cup-shaped, other shapes may be used to adapt to other shapes of microphones and speakers. The acoustic interfaces 211 and 212 include a microphone and a sound generator (not shown) to communicate with the pay phone payment device 116 via the handset 232 of the telephone station 206. The portable pay phone 112, 114 also may include the card reader 204 for receiving the smart card 206.

When making a call, the caller places the acoustic interfaces 211 and 212 on the handset 232 of the telephone station 230 and dials the access number and the destination number using the keypad 234 of the telephone station 230. As before, the messages of the pay phone payment device 116 may be output via the handset 232 or displayed on a display of the telephone station 230, if available, so that the caller may respond to the pay phone payment device 116 request for inserting the smart card 206 into the card reader 204, for example.

Figure 4:
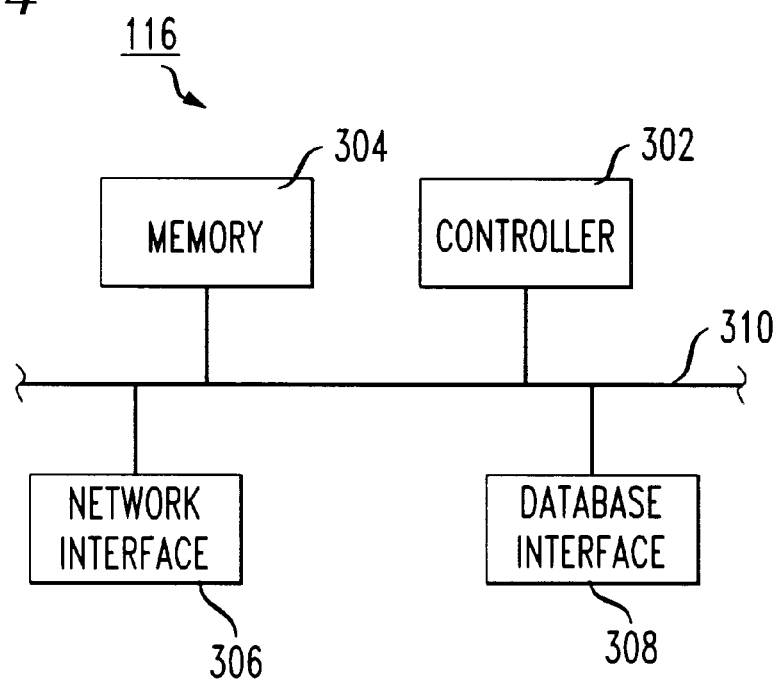
FIG. 4 is an exemplary block diagram of a pay phone payment device.

FIG. 4 shows an exemplary block diagram of the pay phone payment device 116. The pay phone payment device 116 may include a controller 302, a memory 304, a network interface 306, and a database interface 308. The above components may be coupled together via a signal bus 310.

When the caller calls the point of presence device 106 or the pay phone payment device 116 directly via the portable pay phone 112, 114, using the local access number, and dials the destination number corresponding to telephone station 110 or 121, for example, the controller 302 receives the portable pay phone request and outputs a message to the portable pay phone 114 to insert the smart card 206. When the smart card 206 is inserted, the controller 302 accesses the smart card 206 to retrieve the type of currency and amount of funds in each of the currencies that are available.

Figure 5:
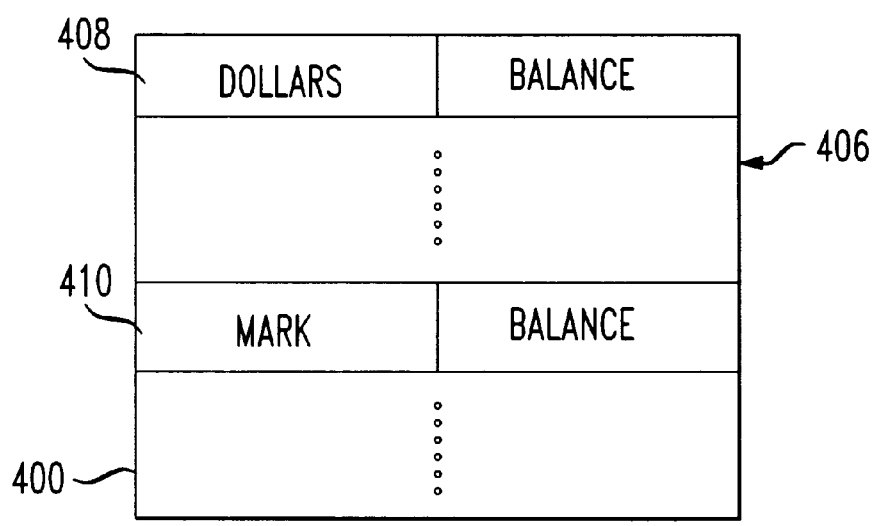
FIG. 5 is an exemplary diagram of a database for a caller to the pay phone payment device.

FIG. 5 shows an exemplary diagram of the contents 400 of the smart card 206. The contents 400 may include a currency area 406 that indicates amounts of funds available in various currencies such as dollars 408 and mark 410. Other information may also be included which may be convenient to store in the smart card, such as credit card numbers, insurance numbers, etc. (not shown).

The pay phone payment device 116 may determine the cost of the call based on the destination number that was dialed by the caller and the location of the portable pay phone 114. If the smart card 206 contains multiple currencies, the pay phone payment device 116 may also determine the lowest cost for the desired call based on current exchange rates, for example. Thus, if the cost for the call is lower when paid in U.S. dollars based on current currency exchange rates, the pay phone payment device 116 collects payment in U.S. dollars instead of German marks, for example.

If U.S. dollars correspond to the lowest cost for the call, the pay phone payment device 116 may first retrieve the entry 408 from the smart card 206 to determine whether the balance is sufficient to pay for the call. If the balance is insufficient, the pay phone payment device 116 may retrieve balances of other currencies that are favorable based on the current exchange rates to determine whether there are sufficient funds in the smart card 206 to pay for the desired call.

Once sufficient amount of funds for the call is obtained, the pay phone payment device 116 debits the cost for the desired call from the smart card 206 and connects the portable pay phone 114 to the destination device (e.g., telephone station 110 or 121) to connect the call. If the smart card 206 contains insufficient funds, then the pay phone payment device 116 outputs a message to that effect to the caller and terminates the request.

When the call is in progress, the pay phone payment device 116 monitors the elapsed time of the call until the call is either completed or the amount of time purchased by the current payment has expired. If the call completes before the time purchased by the current payment has expired, the pay phone payment device 116 accesses the smart card 206 and refunds the current payment that was in excess of the actual cost of the call. However, if the amount of time purchased by the current payment expired before the call is completed, the pay phone payment device 116 sends a message to the caller to query whether the caller desires the pay phone payment device 116 to debit an additional amount from the smart card 206 to continue the call or to terminate the call. The pay phone payment device 116 takes appropriate action based on the caller's response. The above process continues until either the call is completed or the funds contained within the smart card 206 is exhausted.

Figure 6:
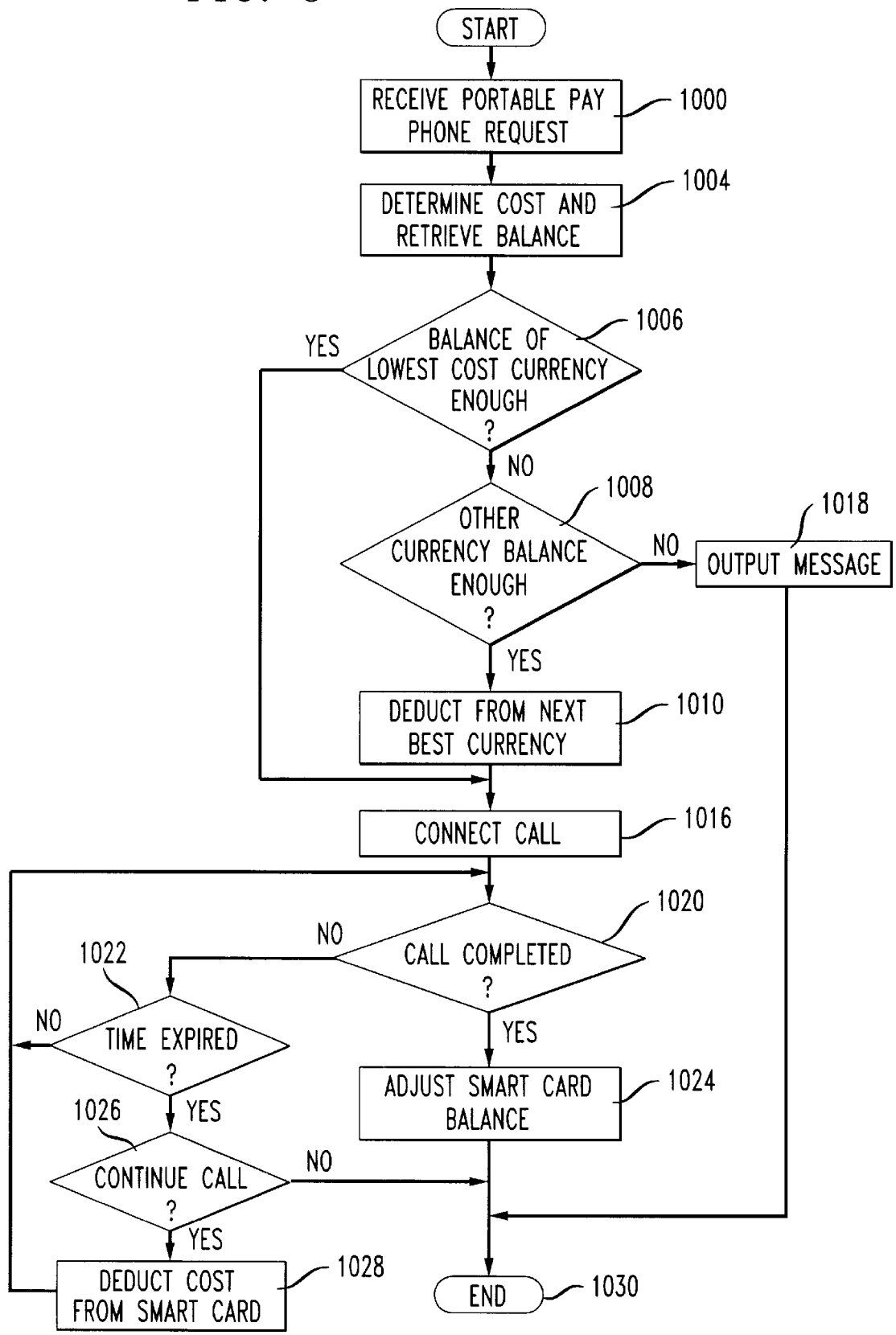
FIG. 6 is a flowchart showing a process of the pay phone payment device.

FIG. 6 shows a flow chart of a process of the pay phone payment device 116. In step 1000, the controller 302 receives a portable pay phone request from a caller for a fixed time period call and then requests the caller to insert the smart card 206 into the card reader 204 and goes to step 1004. In step 1004, the controller 302 determines the cost for the desired call based on data in either the memory 304 or retrieved from a database accessible in the database interface 308 and retrieves the currency balances from the smart card 206 and goes to step 1006. In step 1006, the controller 302 determines whether the balance of the currency that corresponds to the lowest cost for the call is sufficient to cover the call. If sufficient, the controller 302 goes to step 1016; otherwise, the controller 302 goes to step 1008. In step 1008, the controller 302 determines whether the smart card 206 contains sufficient amounts in other currencies. If the amounts in other currencies are sufficient, the controller 302 goes to step 1010; otherwise, the controller 302 goes to step 1018. In step 1018, the controller 302 outputs a reject message to the caller and goes to step 1030 to end the process.

In step 1010, the controller 302 debits from the balance of the next best currency and goes to step 1016. In step 1016, the controller 302 connects the call through the network interface 306 and goes to step 1020. In step 1020, the controller 302 monitors the call through the network interface 306 to determine whether the call is completed. If the call is completed, the controller 302 goes to step 1024; otherwise, the controller 302 goes to step 1022. In step 1024, the controller 302 adjusts the smart card balance in the proper currencies to refund any payment that exceeds the actual cost for the call and goes to step 1030 to end the process. In step 1022, the controller 302 determines whether the time purchased by the payment amount has expired. If expired, the controller 302 goes to step 1026; otherwise, the controller 302 returns to step 1020.

In step 1026, the controller 302 queries whether the caller desires to continue the call for another fixed period of time. If the call is to continue, the controller 302 goes to step 1028; otherwise the controller 302 goes to step 1030 and ends the process. In step 1028, the controller 302 deducts the cost for an additional time interval from the smart card 206 and returns to step 1020.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A method of providing a portable pay phone service, comprising:
   receiving a request for a call from a portable pay phone;
   retrieving payment for the call from a smart card coupled to the portable pay phone, wherein the payment is in a lowest cost currency if the smart card contains funds in multiple currencies; and
   connecting the call if the payment is successfully retrieved from the smart card.

2. The method of claim 1, further comprising:
   retrieving the payment in a single currency contained in the smart card.

3. The method of claim 2, wherein if the funds of the lowest cost currency contained in the smart card are insufficient to pay for the requested call, the method further comprising retrieving a portion of the payment from the lowest cost currency first and then retrieving a next portion of the payment from the next lowest cost currency and so on until the payment is retrieved in full.

4. The method of claim 1, further comprising:
   monitoring the call after the call is connected;
   generating a total amount of charge for the call if the call is completed before a purchase time has expired; and
   refunding a difference between the total amount of charge and the payment retrieved from the smart card.

5. The method of claim 4, further comprising:
   outputting a message to the portable pay phone if the purchased time has expired;
   retrieving an additional payment from the smart card if permission is received from the portable pay phone to do so for continuing the call for another purchased amount of time; and
   terminating the call if permission to retrieve additional payment for continuing the call is denied.

6. The method of claim 1 further comprising receiving the request through a point of presence device of a first network that is accessed by the portable pay phone using a local number of a second network.

7. A method for providing a portable pay phone service over a network, comprising:
   providing for a card reader;
   coupling a voice communication device to the card reader;
   coupling the card reader to the network; and
   connecting the voice communication device to a pay phone payment device in a call through the network via either a local number or a special access number, wherein payment is in a lowest cost currency if multiple currencies are present.

8. The method of claim 7, further comprising:
   acoustically coupling the card reader to a hand set of the voice communication device, wherein the card reader is coupled to the network via the acoustic coupling.

9. The method of claim 8, wherein the acoustically coupling step comprises placing cup shaped covers over a microphone and a ear phone portions of the hand set of the voice communication device.

10. The method of claim 7, wherein the card reader includes an adapter, the method further comprising:
    connecting the voice communication device to the adapter; and
    connecting the adapter to the network, wherein the voice communication device and the card reader are coupled to the network through the adapter.

11. A device that provides a portable pay phone service, comprising:
    a database; and
    a controller coupled to the database, the controller receiving a request for a call from a portable pay phone, retrieving payment, wherein the payment is in a lowest cost currency if the smart card contains funds in multiple currencies for the call from a smart card coupled to the portable pay phone, and connecting the call if the payment is successfully retrieved from the smart card.

12. The device of claim 11, wherein the controller retrieves the payment in a single currency contained in the smart card.

13. The method of claim 12, wherein if the funds of the lowest cost currency contained in the smart card are insufficient to pay for the requested call, the controller retrieving a portion of the payment from the lowest cost currency first and then retrieving a next portion of the payment from the next lowest cost currency and so on until the payment is retrieved in full.

14. The device of claim 11, wherein the controller monitors the call after the call is connected, generates a total amount of charge for the call if the call is completed before a purchase time has expired, and refunds a difference between the total amount of charge and the payment retrieved from the smart card.

15. The device of claim 14, wherein the controller outputs a message to the portable pay phone if the purchased time has expired, retrieves an additional payment from the smart card if permission is received from the portable pay phone to do so for continuing the call for another purchased amount of time, and terminates the call if permission is denied to retrieve additional payment for continuing the call.

16. The device of claim 11, wherein the controller receives the request through a point of presence device of a first network that is accessed by the portable pay phone using a local number of a second network.

17. A device that provides a portable pay phone service over a network, comprising:

a card reader; and a voice communication device coupled to the card reader, wherein the card reader is coupled to the network and the voice communication device is connected to a pay phone payment device in a call through the network via either a local number or a special access number, wherein payment is in a lowest cost currency if multiple currencies are present.

18. The device of claim 17, wherein the card reader is acoustically coupled to a hand set of the voice communication device, the card reader being coupled to the network via the acoustic coupling.

19. The device of claim 18, wherein the card reader is acoustically coupled to the hand set by placing cup shaped covers over a microphone and a ear phone portions of the hand set of the voice communication device.

20. The device of claim 17, wherein the card reader includes an adapter, the voice communication device being connected to the adapter and the adapter being connected to the network, so that the voice communication device and the card reader are coupled to the network through the adapter.

* * * * *